(12) United States Patent
Sugita et al.

(10) Patent No.: US 10,294,910 B2
(45) Date of Patent: May 21, 2019

(54) IGNITION APPARATUS

(71) Applicant: DENSO CORPORATION, Kariya, Aichi-pref. (JP)

(72) Inventors: Shun Sugita, Nishio (JP); Shunichi Takeda, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/573,922

(22) PCT Filed: May 9, 2016

(86) PCT No.: PCT/JP2016/063736
§ 371 (c)(1),
(2) Date: Nov. 14, 2017

(87) PCT Pub. No.: WO2016/185928
PCT Pub. Date: Nov. 24, 2016

(65) Prior Publication Data
US 2018/0283344 A1      Oct. 4, 2018

(30) Foreign Application Priority Data

May 15, 2015   (JP) ................. 2015-100265

(51) Int. Cl.
*F02P 15/10*   (2006.01)
*F02P 3/00*    (2006.01)
(Continued)

(52) U.S. Cl.
CPC ........ *F02P 5/1502* (2013.01); *F02D 41/1454* (2013.01); *F02P 3/04* (2013.01);
(Continued)

(58) Field of Classification Search
CPC ...................................................... F02P 5/045
See application file for complete search history.

(56) References Cited

U.S. PATENT DOCUMENTS

| 2003/0034008 A1 | 2/2003 | Katoh et al. |
| 2011/0144881 A1 | 6/2011 | Glugla et al. |

(Continued)

FOREIGN PATENT DOCUMENTS

| JP | 2008-196330 | 8/2008 |
| JP | 2014-206068 | 10/2014 |
| JP | 2015-200274 | 11/2015 |

*Primary Examiner* — Hieu T Vo
*Assistant Examiner* — Arnold Castro
(74) *Attorney, Agent, or Firm* — Nixon & Vanderhye PC

(57) ABSTRACT

An ignition apparatus for an internal combustion engine is provided. The ignition apparatus includes an ECU. The ECU calculates a target value E* of an energy input amount of energy inputted into a spark plug based on an in-cylinder flow velocity v, a cylinder pressure P, and an air-fuel ratio AFR. The ECU also calculates a command value I* of a secondary current based on the in-cylinder flow velocity and control an operation of a second circuit according to the target value E* and the command value I*. The calculation of the target value E* using the in-cylinder flow velocity v, the cylinder pressure P, and the air fuel ratio AFR enables the energy input amount to be controlled according to the operating state of the internal combustion engine. The calculation of the command value I* based on the in-cylinder flow velocity v enables the secondary current to be controlled so as to eliminate a risk of the blowout of sparks. The ignition apparatus is, thus, capable of variably changing the amount of energy inputted to the spark plug to improve the fuel consumption.

7 Claims, 5 Drawing Sheets

(51) Int. Cl.
    *F02P 5/15*           (2006.01)
    *F02D 41/14*         (2006.01)
    *F02P 3/04*           (2006.01)
    *F02P 5/04*           (2006.01)
    *F02P 3/08*           (2006.01)
    *F02P 9/00*           (2006.01)

(52) U.S. Cl.
    CPC ...... *F02P 5/045* (2013.01); *F02D 2200/0406* (2013.01); *F02D 2200/101* (2013.01); *F02P 3/0442* (2013.01); *F02P 3/0892* (2013.01); *F02P 5/1504* (2013.01); *F02P 9/002* (2013.01); *F02P 9/007* (2013.01); *F02P 15/10* (2013.01); *Y02T 10/46* (2013.01)

(56) References Cited

U.S. PATENT DOCUMENTS

| | | |
|---|---|---|
| 2016/0084213 A1 | 3/2016 | Nakayama et al. |
| 2016/0102648 A1 | 4/2016 | Nakayama et al. |
| 2017/0045025 A1* | 2/2017 | Nakayama .............. F02P 3/051 |
| 2017/0122281 A1* | 5/2017 | Imanaka ................... F02P 3/05 |
| 2017/0292492 A1* | 10/2017 | Inada ..................... F02P 1/083 |

* cited by examiner

IGNITION APPARATUS

This application is the U.S. national phase of International Application No. PCT/JP2016/063736 filed May 9, 2016 which designated the U.S. and claims priority to JP Patent Application No. 2015-100265 filed May 15, 2015, the entire contents of each of which are hereby incorporated by reference.

TECHNICAL FIELD

The invention is generally relates to an ignition apparatus for use in an internal combustion engine.

BACKGROUND ART

A conventional ignition apparatus is known which includes an ignition coil equipped with a primary coil and a secondary coil and a spark plug connected to the secondary coil, and works to supply energy to the spark plug by means of electromagnetic induction arising from energization and deenergization of the primary coil, thereby creating spark discharges.

In the known conventional ignition apparatus, the amount of energy inputted to the spark plug depends directly on specifications of the ignition coil. This may cause an excessive amount of energy to be supplied to the spark plug depending upon operating conditions. The direct dependence of the energy input amount, therefore, contributes to increased consumption of fuel.

Ignition apparatuses which are capable of variably changing the energy input amount to improve the fuel consumption are, therefore, sought.

Japanese Patent No. 3791364 teaches an ignition timing control apparatus as described below.

The ignition timing control apparatus works to increase an advance angle limiter which limits a maximum value of an ignition timing advance angle in a transient period including start of an internal combustion engine to be greater than that in a non-transient period in order to ensure a required amount of ignition energy. The ignition timing control apparatus is, however, designed to determine the energy input amount depending upon the specifications of the ignition coil, which is thought of as contributing less to the improvement of fuel consumption.

SUMMARY OF THE INVENTION

Problem to be Solved by the Invention

The invention was made in view of the above problems. It is an object to provide an ignition apparatus for an internal combustion engine which variably changes the amount of energy inputted to a spark plug for improving consumption of fuel.

Means for Solving the Problem

An ignition apparatus of this invention is equipped with an ignition coil including a primary coil and a secondary coil and a spark plug connected to the secondary coil and works to input energy to the spark plug using electromagnetic induction resulting from energization and deenergization of the primary coil, thereby producing a discharge of a spark.

The ignition apparatus is equipped with a first circuit, a second circuit, and a control portion. The first circuit energizes or deenergizes the primary coil to initiate a discharge of a spark in the spark plug. The second circuit produces a flow of current through the primary coil in a direction opposite a direction in which a flow of current through the primary coil was produced by the first circuit during the discharge of the spark initiated by the first circuit, thereby keeping a flow of current through the secondary coil in the same direction as when a flow of current through the secondary coil has been initiated by the first circuit, to continue a spark discharge. The control portion controls an operation of the first circuit.

The control portion calculates a target value of an energy input amount of energy delivered to the spark plug based on an in-cylinder flow velocity that is a rate of flow in a cylinder of the internal combustion engine, a cylinder pressure that is a pressure in the cylinder of the internal combustion engine, and an air-fuel ratio. The control portion also calculates a command value of a secondary current that is a flow of current through the secondary coil based on the in-cylinder flow velocity. The control portion controls the operation of the second circuit using the target value of the energy input amount and the command value of the secondary current.

The calculation of the target value of the energy input amount using the in-cylinder flow velocity, the cylinder pressure, and the air fuel ratio enables the energy input amount to be controlled according to the operating state of the internal combustion engine. The calculation of the command value of the secondary current based on the in-cylinder flow velocity enables the secondary current to be controlled so as to eliminate a risk of spark blowout. The ignition apparatus for the internal combustion engine is, thus, capable of variably changing the amount of energy inputted to the spark plug to improve the fuel consumption.

Blowout is a phenomenon where a path of a spark is extended and then cut by a gas flow, so that a spark occurs again. The blowout is responsible for an increase in load on the spark plug as well as unwanted consumption of energy and is, thus, thought of as being objectionable in terms of reduction in fuel consumption and increase in service life of the spark plug.

EMBODIMENT FOR CARRYING OUT THE INVENTION

Embodiments for carrying out the invention will be described using the drawings. The embodiments are merely examples. The invention should not be limited to the embodiments.

Embodiment

Structure of Embodiment

Figure 1:
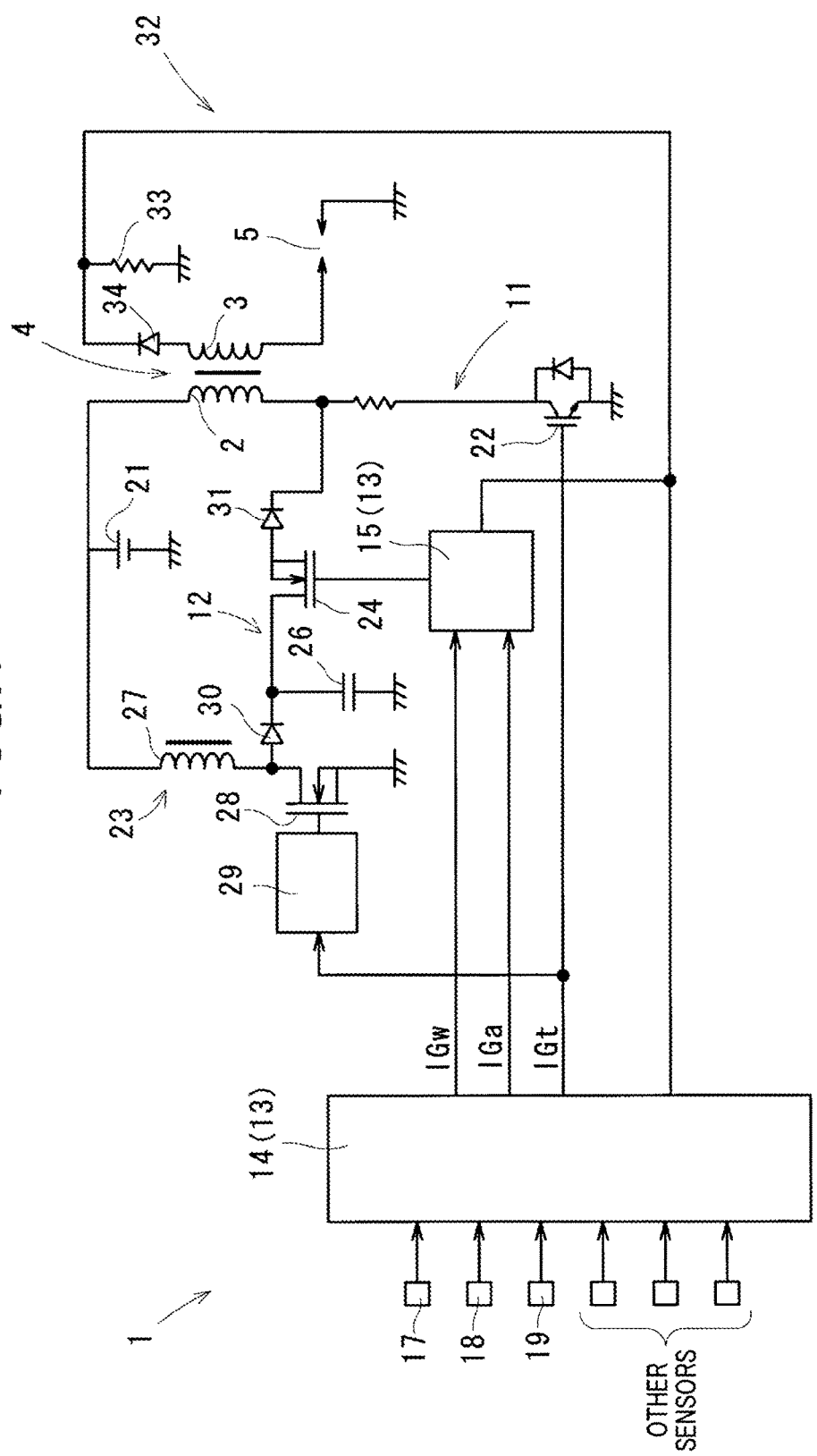
FIG. 1 is a structural view of an ignition apparatus (Embodiment).
Figure 2:
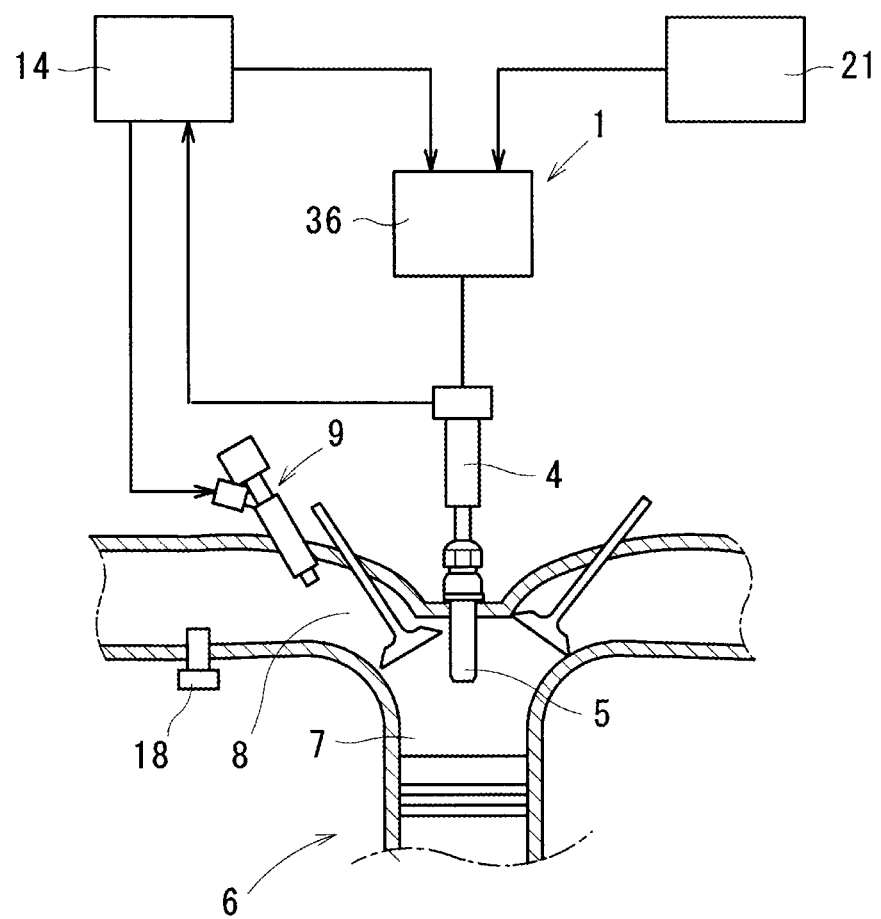
FIG. 2 is an overall structural view of an ignition apparatus and an internal combustion engine (Embodiment).

The ignition apparatus 1 of an embodiment will be described below with reference to FIGS. 1 and 2.

The ignition apparatus 1 includes the ignition coil 4 equipped with the primary coil 2 and the secondary coil 3 and the spark plug 5 connected to the secondary coil 3. The ignition apparatus 1 works to input or delivery energy to the spark plug 5 through electromagnetic induction resulting from energization and deenergization of the primary coil 2 to create a spark. The ignition apparatus 1 is mounted on the internal combustion engine 6 for use in driving the vehicle and works to ignite air-fuel mixture in the cylinder 7 at a given ignition time.

The spark plug 5 has a known structure and is equipped with a center electrode connected to an end of the secondary coil 3 and a ground electrode connected to ground through a cylinder head of the internal combustion engine 6. The energy produced by the secondary coil 3 is used to create sparks between the center electrode and the ground electrode.

The internal combustion engine 6 is, for example, of a port-direct injection type which is equipped with the injector 9 to spray fuel into the intake port 8. The internal combustion engine 6 is also capable of performing lean-burn of fuel and is mounted so that a spiral flow, such as a swirl or a tumble flow of air-fuel mixture is crated in the cylinder 7.

The ignition apparatus 1 will be described below in detail.

The ignition apparatus 1 is equipped with the first and second circuits 11 and 12 and the control portion 13. The first circuit 11 works to energize and then deenergize the primary coil 2 to initiate discharge of sparks in the spark plug 5. The second circuit 12 works to create a flow of electric current through the primary coil 2 in a direction opposite a direction in which a flow of electric current was produced by the first circuit 11 through the primary coil 2 during discharge of a spark initiated by the first circuit 11, thereby keeping a flow of electric current through secondary coil 3 in the same direction as when the energization of the secondary coil 3 has been initiated by the operation of the first circuit 11 to continue to input or delivery energy to the spark plug 5, thereby achieving continuation of discharge of sparks. The control portion 13 works to control the operations of the first and second circuits 11 and 12 and is made up of an electronic control unit (which will also be referred to below as the ECU 14) and the driver 15.

The ECU 14 functions as a central controller for the internal combustion engine 6 and outputs a variety of signals, such as the ignition signal IGt and the discharge-continuing signal IGw, to control the energization of the primary coil 2, thereby regulating electrical energy induced in the secondary coil 3 to control the discharge of sparks in the spark plug 5. The ignition signal IGt and the discharge-continuing signal IGw will be discussed later.

The ECU 14 receives outputs from a variety of different sensors which are mounted in the vehicle and measure parameters representing operating and controlled conditions of the internal combustion engine 6. The ECU 14 is equipped with an input circuit, a CPU, memories, a control circuit. The input circuit processes signals inputted thereto. The CPU performs control and operation tasks for controlling the internal combustion engine 6 using the input signals. The memories store therein data and programs required to control the internal combustion engine 6. The output circuit works to output signals required to control the internal combustion engine 6 using results of the operations of the CPU.

The sensors which output signals to the ECU 14 include the rotational speed sensor 17, the intake pressure sensor 18, and the air-fuel ratio sensor 19. The rotational speed sensor 17 works to measure a rotational speed of the internal combustion engine 6. The intake pressure sensor 18 works to measure the pressure of intake air sucked into the internal combustion engine 6. The air-fuel ratio sensor 19 works to measure an air-fuel ratio of the mixture. The ECU 14 performs ignition control or fuel injection control for the internal combustion engine 6 using parameters derived by the above sensors.

The first circuit 11 connects between the positive (+) terminal of the battery 21 and one of ends of the primary coil 2 and also connects the other end of the primary coil 2 (which will also be referred to below as a second terminal) and has a discharge start switch (which will be referred to below as a first switch 22) disposed on the ground side (i.e., a low potential side) of the primary coil 2.

The first circuit 11 turns on and off the first switch 22 to store energy in the primary coil 2 and also uses the energy in the primary coil 2 to develop high voltage in the secondary coil 3 for initiating discharge of a spark in the spark plug 5.

The discharge of a spark created by the operation of the first circuit 11 will be referred to below as main spark-ignition. The direction of energization of the primary coil 2 (i.e., a direction in which the primary current flows) from the battery 21 to the first switch 22 will also be referred to as a plus side.

More specifically, the first circuit 11 turns on the first switch 22 for a period of time in which the ignition signal IGt is inputted by the ECU 14 to the first switch 22, thereby applying the voltage from the battery 21 to the primary coil 2 to produce a flow of a positive primary current therethrough, thereby storing magnetic energy in the primary coil 2. Afterwards, the first circuit 11 turns off the first switch 22 to develop high voltage at the secondary coil 3 through electromagnetic induction to create the main spark-ignition.

The first switch 22 is implemented by a power transistor, a MOS transistor, or a thyristor. The ignition signal IGt is a command signal indicating a period of time for which the first circuit 11 stores the energy in the primary coil 2 and the ignition timing (i.e., a spark start time).

The second circuit 12 connects with the first circuit 11 between the primary coil 2 and the first switch 22 and has a switch (which will also be referred to as a second switch 24) which establishes or blocks a supply of electrical power from the step-up circuit 23 to the primary coil 2.

The step-up circuit 23 works to step-up the voltage at the battery 21 and store it in the capacitor 26 for a period of time in which the ignition signal IGt is outputted from the ECU 14. Specifically, the step-up circuit 23 is equipped with the capacitor 26, the choke coil 27, the step-up switch 28, the step-up driver 29, and the diode 30.

The choke coil 27 is connected at an end thereof to the positive terminal of the battery 21 and energized or deenergized by the step-up switch 28. The step-up driver 29 outputs a control signal to the step-up switch 28 to turn on or off the step-up switch 28. The magnetic energy which is generated in the choke coil 27 by the on-off operations of the step-up switch 28 is stored as electrical energy in the capacitor 26.

The step-up driver 29 cyclically turns on and off the step-up switch 28 at a given interval for a period of time in which the ignition signal IGt is inputted thereto from the ECU 14. The diode 30 serves to avoid a backflow of the energy, as stored in the capacitor 26, to the choke coil 27. The step-up switch 28 is implemented by, for example, a MOS transistor.

The second circuit 12 is equipped with the second switch 24 and the diode 31. The second switch 24 is implemented by, for example, a MOS transistor and works to selectively deliver the energy, as stored in the capacitor 26, to the negative side of the primary coil 2. The diode 31 serves to avoid a backflow of current from the primary coil 2 to the second switch 24. The second switch 24 is turned on in response to a control signal from the driver 15 to deliver the energy from the step-up circuit 23 to the negative side of the primary coil 2.

The driver 15 turns on and then off the second switch 24 for a period of time in which the discharge-continuing signal IGw is inputted thereto, thereby controlling the energy delivered or inputted from the capacitor 26 to the primary coil 2 to control the secondary current that is a function of a degree to which the secondary coil 3 is energized. The driver 15 will be referred to below as an energy inputting driver 15. The discharge-continuing signal IGw is a command signal which indicates a period of time for which the spark discharge, as initiated as the main spark-ignition, is maintained. More specifically, the discharge-continuing signal IGw is a signal indicating an energy input duration in which the second switch 24 is cyclically turned on and off to deliver or input the energy from the step-up circuit 23 to the primary coil 2.

As apparent from the above discussion, the second circuit 12 creates a flow of electric current through the primary coil 2 in a direction opposite a direction of a flow of electric current that was produced by the first circuit 11 through the primary coil 2 during discharge of a spark which has been initiated by the first circuit 11, thereby keeping a flow of the secondary current in the same direction as when the secondary current has been initiated by the operation of the first circuit 11 to continue the discharge of sparks.

In the following discussion, discharge of sparks, as created by the operation of the second circuit 12, following the main spark-ignition will also be referred to as a continuing spark discharge.

The energy inputting driver 15 receives the current command signal IGa from the ECU 14 which indicates a command value of the secondary current and then controls the secondary current based on the current command signal IGa.

The secondary coil 3 is, as described above, connected at the first end thereof to the center electrode of the spark plug 5 and at the second end to the F/B circuit 32 which works to measure the secondary voltage developed at the secondary coil 3 and the secondary current and feed them back to the control portion 13. Specifically, the second end of the secondary coil 3 is connected to the F/B circuit 32 through the diode 34 which serves to permit the secondary current to flow only in one direction. The F/B circuit 32 is connected to the shunt resistor 33 for measuring the secondary current.

The energy inputting driver 15 controls the on-off operations of the second signal 24 using the detected value of the secondary current feedback thereto and a command value of the secondary current, as derived using the current command signal IGa. Specifically, the energy inputting driver 15 determines threshold values of upper and lower limits of the detected value of the secondary current based on the command value and starts or stops outputting the control signal based on a result of comparison between the detected value and the upper and lower limit threshold values. More specifically, the energy inputting driver 15 stops outputting the control signal when the detected value of the secondary current exceeds the upper limit and alternatively starts outputting the control signal when the detected value of the secondary current is lower than the lower limit.

The first and second circuits 11 and 12, the F/B circuit 32, and the energy inputting driver 15 are installed in a single case as the ignition circuit unit 36. Each of the spark plug 5, the ignition coil 4, and the ignition circuit unit 36 is, as can be seen in FIG. 2, provided for the respective cylinder 7.

The operation of the ignition apparatus 1 when operating properly will be described below with reference to FIG. 3.

Figure 3:
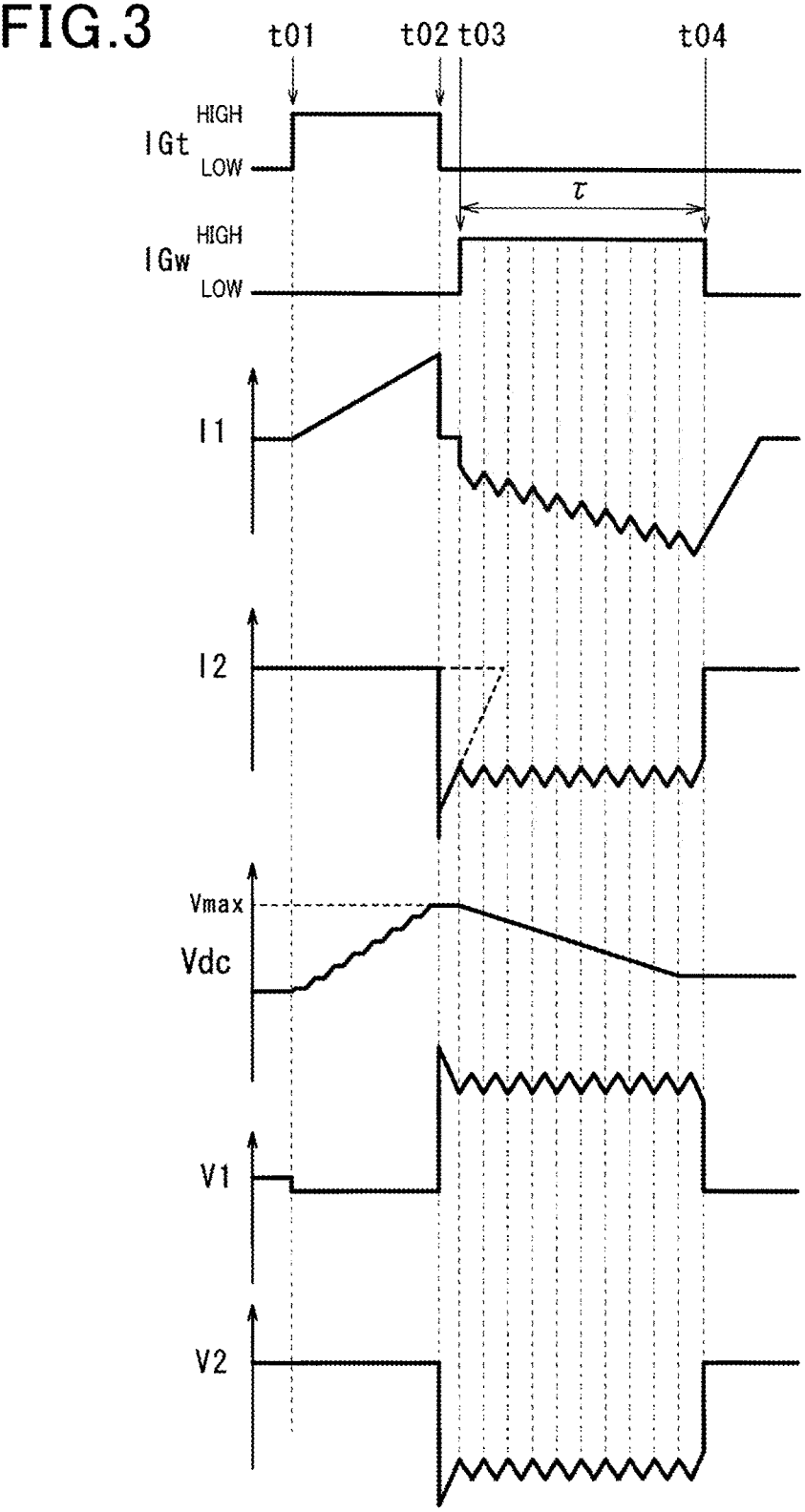
FIG. 3 is a time chart which demonstrates an operation of an ignition apparatus when properly operating (Embodiment).

In FIG. 3, "IGt" represents an input state of the ignition signal IGt using the high level or the low level. "IGw" represents an input state of the ignition signal IGt using the high level or the low level. "I1" and "V1" represent the primary current (i.e., the value of current flowing through the primary coil 2) and the primary voltage (i.e., the value of voltage applied to the primary coil 2), respectively. "I2" and "V2" represent the secondary current (i.e., the value of current flowing through the secondary coil 3) and the secondary voltage (i.e., the value of voltage applied to secondary coil 3), respectively. "Vdc" represents energy stored in the capacitor 26 in terms of voltage.

When the ignition signal IGt is changed from the low level to the high level at time t01, the first switch 22 is kept on for which the ignition signal IGt is in the high level, thereby producing a flow of the positive primary current, so that the energy is accumulated in the primary coil 2. The step-up switch 28 is turned on and off cyclically to store the step-upped energy in the capacitor 26.

Subsequently, when the ignition signal IGt is changed from the high level to the low level at time t02, the first switch 22 is turned off, thereby deenergizing the primary coil 2. This causes the secondary coil 3 to develop high voltage through the electromagnetic induction, thereby creating the main spark-ignition in the spark plug 5. After the main spark-ignition occurs in the spark plug 5, the secondary current is damped in the form of a triangular wave (see a broken line of I2). The discharge-continuing signal IGw is changed from the low level to the high level at time t03 before the secondary current reaches the threshold value of the lower limit When the discharge-continuing signal IGw has been changed from the low level to the high level, the second switch 24 is turned on and off cyclically, thereby delivering or inputting the energy, as stored in the capacitor 26, to the negative side of the primary coil 2. The primary current flows from the primary coil 2 to the positive terminal of the battery 21. More specifically, each time the second switch 24 is turned on, the primary current is additionally delivered from the primary coil 2 toward the positive terminal of the battery 21, so that the primary current increases, in sequence, toward the negative side (see time t03 to time t04).

Each time the primary current is added to the battery 21, the secondary current which is oriented in the same direction as that in which the secondary current flows to create the main spark-ignition is sequentially added to the secondary coil 3, so that the secondary current is kept between the upper and lower limits.

In the above way, the second switch 24 is sequentially turned on and off, thereby causing the secondary current to continue to flow with a degree which maintains the discharge of sparks. This causes the continuing spark discharge to be achieved in the spark plug 5 as long as the discharge-continuing signal IGw is in the on-state.

The ECU 14 stores therein a command value indicating a target value E* of an input amount E of energy delivered by the second circuit 12 in each combustion cycle and a command value indicating the secondary current I2. The ECU 14 determines an energy input duration τ in which the energy is delivered by the second circuit 12 based on the command values of the target value E* of the input amount E and the secondary current I2 and then continues to output the discharge-continuing signal IGw for a period of time that is the energy input duration τ.

Feature of the Embodiment

Next, a characteristic structural of the embodiment will be described below.

The ECU 14 working as the control portion 3 calculates the target value E* based on the in-cylinder flow velocity v that is a rate of flow in the cylinder 7 of the internal combustion engine 6, the cylinder pressure P that is pressure in the cylinder 7 of the internal combustion engine 6, and the air-fuel ratio AFR. The ECU 14 also calculates the command value I* based on the in-cylinder flow velocity v. The ECU 14 then controls the operation of the second circuit 12 as a function of the target value E* and the command value I*.

Specifically, the ECU 14 determines the command value I* and the target value E* according to the following equations 1 and 2.

$$I^* = a \cdot v \qquad \text{Eq. 1}$$

where a is a constant.

$$E^* = b \cdot v + c \cdot P + d \cdot \text{AFR} \qquad \text{Eq. 2}$$

where b, c, and d are constants.

The ECU 14 calculates the in-cylinder flow velocity v based on a detected value of the rotation speed derived by the rotational speed sensor 17 and then substitutes it into Eq. 1 to derive the command value I*. The ECU 14 also calculates the cylinder pressure P based on a detected value of the intake pressure derived by the intake pressure sensor 18 and then substitutes it into Eq 2 to determine target value E*.

The ECU 14 works as an injection quantity commanding portion to calculate a command value of an injection quantity of fuel to be sprayed by the injector 9 for performing a fuel injection control operation. The ECU 14 also works as an intake quantity detecting portion to calculate the volume of intake air that is a flow rate of the intake air sucked into the internal combustion engine based on a detected value of the pressure of the intake air derived by the intake pressure sensor 18.

The ECU 14 determines whether the operating state of the internal combustion engine 6 is a steady state or a transient state based on one of a detected value of the intake air derived by the intake pressure sensor 18 and a detected value of the rotational speed derived by the rotational speed sensor 17. When determining that the operating state of the internal combustion engine 6 is the transient state, the ECU 14 calculates an air-fuel ratio using the command value of the injection quantity and the calculated value of the intake air volume.

Control Method in Embodiment

Figure 4:
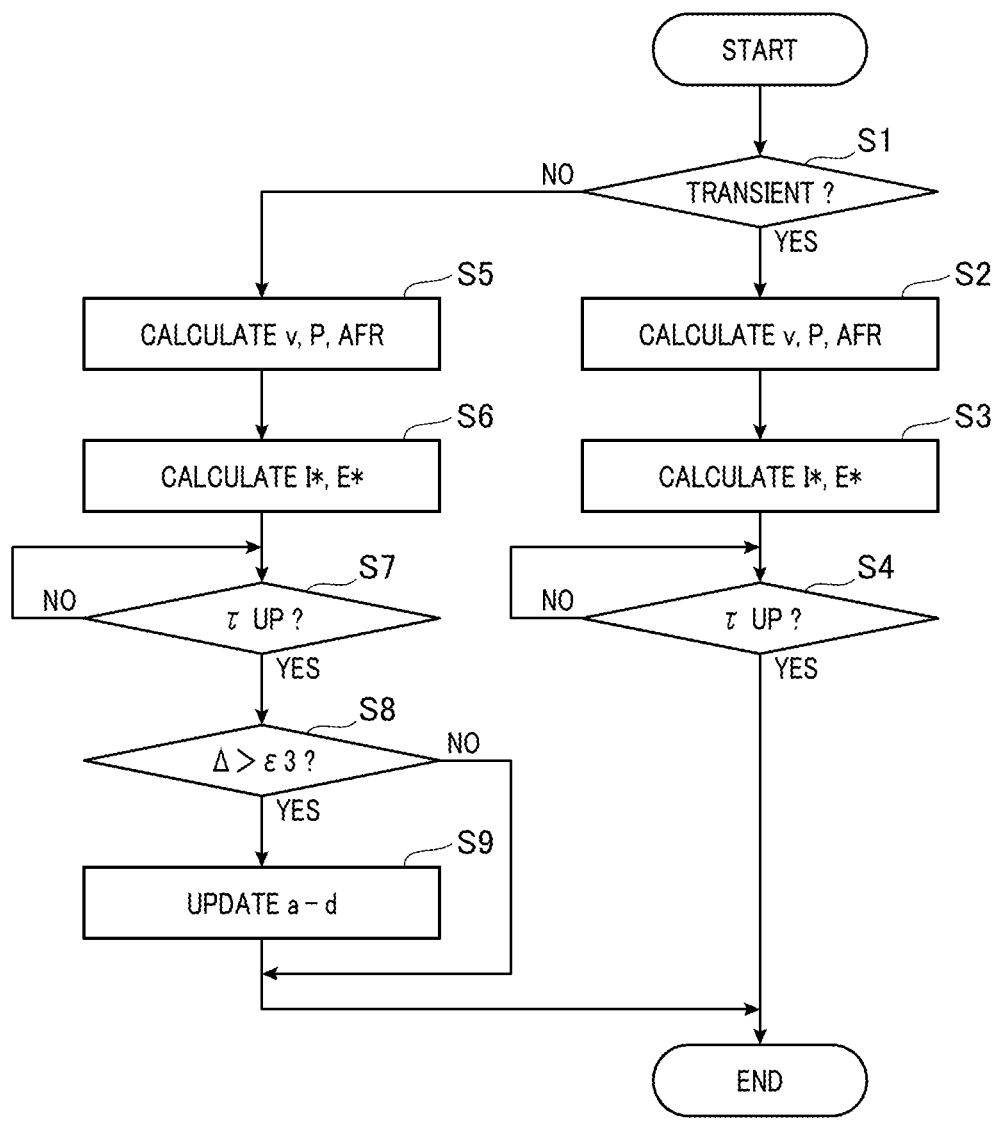
FIG. 4 is a flowchart of a control operation of an ignition apparatus (Embodiment).

The control operation of the ECU 14 to control the second circuit 12 will be described with reference to a flowchart illustrated in FIG. 4.

First, in step S1, it is determined whether the internal combustion engine is in the transient state or not. This determination is, as described above, made using one of a detected value of the intake pressure derived by the intake pressure sensor 18 and a detected value of the rotational speed derived by the rotational speed sensor 17.

Specifically, threshold values ε1 and ε2 are set for, for example, time-sequential change rates of the intake pressure and the rotational speed. If the time-sequential change rate of the intake pressure has exceeded the threshold value ε1 or the time-sequential change rate of the rotational speed has exceeded the threshold value ε2, the transient state is determined as having been entered (YES). The routine then proceeds to step S2. Alternatively, if the time-sequential change rate of the intake pressure is less than the threshold value ε1 and the time-sequential change rate of the rotational speed is less than the threshold value ε2, the internal combustion engine 6 is in the steady state (NO). The routine then proceeds to step S5.

In step S2, the in-cylinder flow velocity v, the cylinder pressure P, and the air-fuel ratio AFR are determined. The routine proceeds to step S3. In step S2, the air-fuel ratio AFR is calculated using the command value of the injection quantity and the detected value of the intake air volume.

In step S3, the target value E* of the energy input amount achieved by the second circuit 12 and the command value I* of the secondary current are calculated. Specifically, the target value E* and the command value I* are, as described above, determined according to Eqs. 1 and 2 using the in-cylinder flow velocity v, the cylinder pressure P, and the air-fuel ratio AFR. The energy input duration E is also calculated using the calculated target value E* and the calculated command value I*.

In step S4, a NO answer is obtained until the energy input duration τ expires. The second circuit 12 continues to deliver the energy to keep the spark discharge.

In step S5, a detected value derived by the air fuel ratio sensor 19 is determined as a value of the air fuel ratio AFR. Steps S6 and S7 perform the same operations as in steps S3 and S4. If it is determined in step S7 that energy input duration τ has expired, then the routine proceeds to step S8 wherein it is determined whether the constants a to d in Eqs. 1 and 2 should be updated or not. Specifically, a difference Δ between the target value E* calculated in Eq. 2 and an actual value of the energy input amount is calculated. It is determined whether the difference Δ is smaller than the threshold value ε3 or not.

If the difference Δ is determined to be greater than the threshold value ε3 (YES) meaning that it is necessary to update the constants a to d, then the routine proceeds to step S9 wherein the constants a to d are updated. Alternatively, if the difference Δ is determined to be smaller than the threshold value ε3 (NO), then the routine terminates without updating the constants a to d. The updating of the constants a to d is achieved in the way wherein the constants a to d are initially set to be great, so that energy input duration τ has a great value and is then gradually decreased.

Operation in Embodiment

Figure 5:
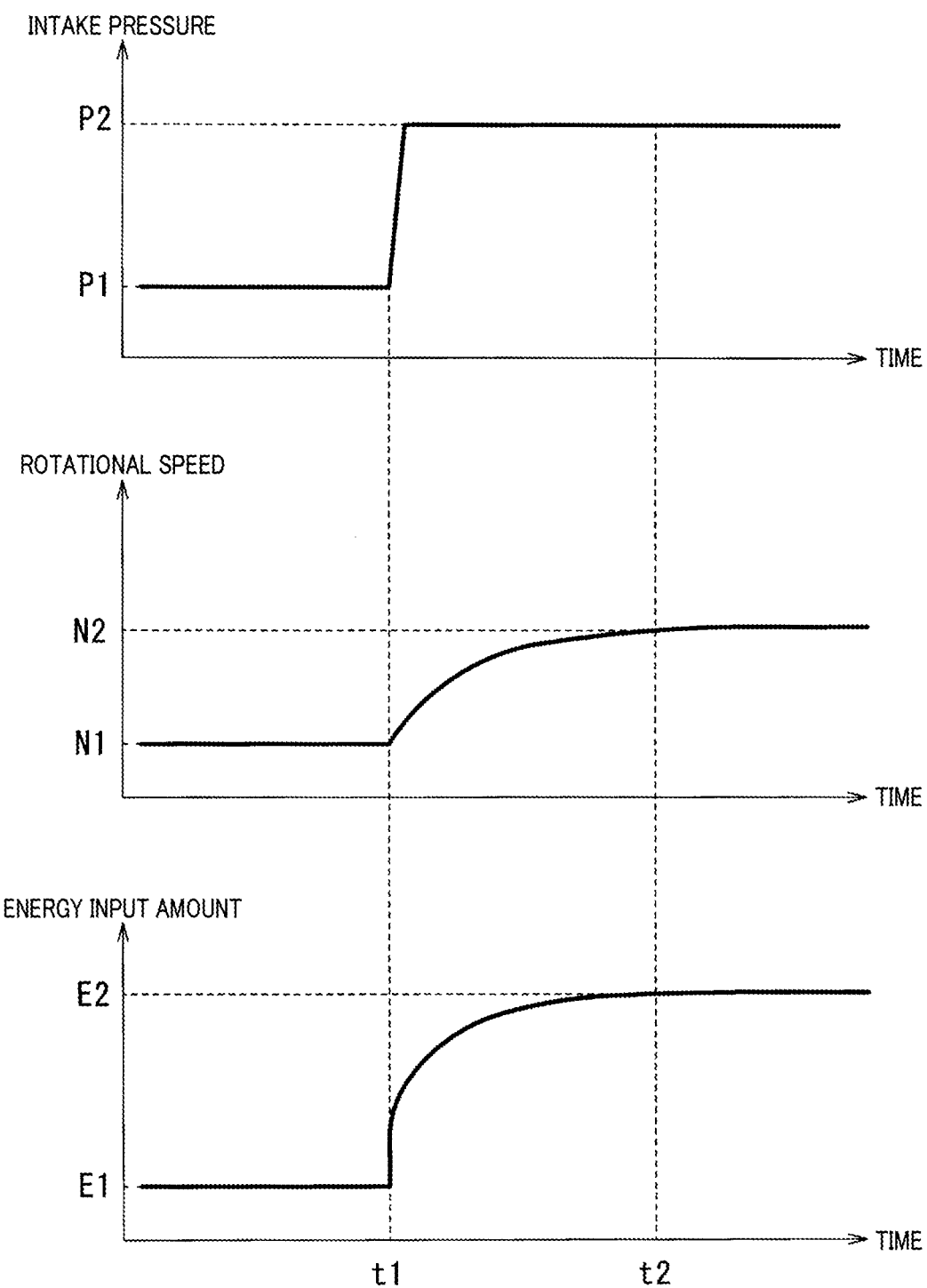
FIG. 5 is a time chart which demonstrates a time sequential change in intake pressure, rotational speed, and energy input amount (Embodiment).

An example of an operation of the ignition apparatus 1 will be described below using FIG. 5.

It is assumed that the ignition control operation is being performed in a condition wherein the energy input amount is E1 in the steady state where the intake pressure is at P1, and the rotation speed is at N1. In this case, step S1 determines that the operating state is the steady state. Steps S5 to S9 are, thus, performed in sequence to execute the ignition control operation. It is also assumed that in such a condition, a driver executes an accelerating operation, so that the intake pressure, the rotational speed, and the energy input amount start increasing (time t1).

In the above example, the time-sequential change rate of the intake pressure and the time-sequential change rate of the rotational speed become greater than the threshold values ε1 and ε2. In step S1, it is, thus, determined that the operating condition is the transient state. The ignition control operation is, thus, performed through steps S2 to S4.

Afterwards, the steady state is reached in which the intake pressure is at P2 which is greater than P1, and the rotational speed is at N2 which is greater than N1. The energy input amount then becomes stable at E2 which is greater than E1. In this period, the time-sequential change rate of the intake pressure and the time-sequential change rate of the rotational speed both become smaller than the threshold values ε1 and ε2. It is, therefore, determined in step S1 that the operating states is the steady state. The ignition control operation is, thus, performed through steps S5 to S9.

Beneficial Effects in Embodiment

The ignition apparatus 1 of the embodiment has the ECU 14 which calculates the target value E* of the energy input amount delivered to the spark plug 5 based on the in-cylinder flow velocity v, the cylinder pressure P, and the air fuel ratio AFR. The ECU 14 also calculates the command value I* of the secondary current based on the in-cylinder flow velocity v and controls the operation of the second circuit 12 according to the target value E* and the command value I*.

The calculation of the target value E* using the in-cylinder flow velocity v, the cylinder pressure P, and the air fuel ratio AFR enables the energy input amount to be controlled according to the operating state of the internal combustion engine 6. The calculation of the command value I* based on the in-cylinder flow velocity v enables the secondary current to be controlled so as to eliminate a risk of the blowout of sparks. The ignition apparatus 1 is, thus, capable of variably changing the amount of energy inputted to the spark plug 5 to improve the fuel consumption.

The ECU 14 calculates the command value I* according to Eq. 1, as described above.

In other words, the ECU 14 uses the simple proportional expression in order to avoid the blowout of sparks, thus resulting in a decrease in operation load on the ECU 14.

The ECU 14 calculates the target value E* according to Eq. 2, as described above.

In other words, the ECU 14 uses the simple linear expression in order to obtain beneficial effects on reduction in fuel consumption, thus resulting in a decrease in operation load on the ECU 14.

The ECU 14 predicts the in-cylinder flow velocity v using a detected value of the rotational speed derived by the rotational speed sensor 17 and substitutes the predicted value of the in-cylinder flow velocity v into Eq. 1 to determine the command value I*. The ECU 14 also predicts the cylinder pressure P using a detected value of the intake pressure derived by the intake pressure sensor 18 and substitutes the predicted value of the cylinder pressure P into Eq. 2 to determine target value E*. In other words, the existing sensors are used to determines values of the in-cylinder flow velocity v and the cylinder pressure P required to calculate the command value I* and target value E*, thus resulting in a decrease in production cost of the ignition apparatus 1.

The ECU 14 works as an injection quantity commanding portion to calculate a command value of the injection quantity of fuel to be sprayed by the injector 9. The ECU 14 also works as an intake quantity detecting portion to calculate the air intake volume based on a detected value of the pressure of the intake air derived by the intake pressure sensor 18. The ECU 14 uses the command value of the injection quantity and the calculated value of the intake air volume to predict the air-fuel ratio AFR. This enables the value of the air-fuel ratio AFR needed to calculate the target value E* to be derived earlier than when it is measured using the air fuel ratio sensor 19. This enables the control operation which greatly improves the fuel consumption to be executed to control the energy input amount.

When determining that the operating condition of the internal combustion engine 6 is the transient state, the ECU 14 uses the command value of the injection quantity and the calculated value of the intake air volume to determine the air-fuel ratio. This enables the control operation which greatly improves the fuel consumption to be executed in the transient state where there is a substantial need for reducing the fuel consumption. In the steady state other than the transient state, a detected value derived by the air fuel ratio sensor 19 is used as a value of the air-fuel ratio AFR, thereby reducing the operation load on the ECU 14 with highly beneficial effects on the fuel economy.

Modifications

The ignition apparatus 1 may be modified in various ways without being limited to the embodiments. For example, the ignition apparatus 1 of the embodiment calculates the target value E* of the energy input amount according to a linear expression (i.e., Eq. 1) using the in-cylinder flow velocity v, the cylinder pressure P, and the air-fuel ratio AFR, but however, the calculation of the target value E* may be achieved in another way. For instance, a power of the in-cylinder flow velocity v, the cylinder pressure P, or the air-fuel ratio AFR may be used in the formula which determines the target value E*. Alternatively, the formula which determines the target value E* may be constructed without use of any one of the in-cylinder flow velocity v, the cylinder pressure P, and the air fuel ratio AFR. Similarly, how to calculate the command value I* of the secondary current is not limited to the proportional expression using the in-cylinder flow velocity v.

In the embodiment, the cylinder pressure P is calculated using a detected value of the intake pressure sensor 18, but however, a cylinder pressure sensor which directly measures the cylinder pressure P may be mounted in the internal combustion engine 6 for using an output of the cylinder pressure sensor as a value of the cylinder pressure P.

The embodiment shows an example where the ignition apparatus 1 is used in the gasoline internal combustion engine 6, but may be applied to the internal combustion engine 6 which is designed to use ethanol fuel or blended fuel or may employ a low-quality fuel.

The embodiment shows an example where the ignition apparatus 1 is applied to the internal combustion engine 6 capable of achieving lean-burn of fuel, but however, is not limited thereto because the continuing spark discharge can be established to improve the ignitability in different status of fuel combustion. The ignition apparatus 1 may be used with the internal combustion engine 6 designed not to execute the lean-burn of fuel.

The embodiment shows an example where the ignition apparatus 1 is applied to the port-injection type which inject fuel into the intake port 8, but however, may be used with a direct injection type of the internal combustion engine 6 which inject fuel directly into the cylinder 7.

The embodiment also shows an example where the ignition apparatus 1 is used with the internal combustion engine 6 which actively produces a spiral flow of the mixture in the cylinder 7, but however, may alternatively be used with the internal combustion engine 6 designed not to have a mechanism which actively produces the spiral flow of the mixture in the cylinder 7.

The invention claimed is:

1. An ignition apparatus for an internal combustion engine which is equipped with an ignition coil including a primary coil and a secondary coil and a spark plug connected to the secondary coil and works to input energy to said spark plug using electromagnetic induction resulting from energization and deenergization of the primary coil to produce a discharge of a spark, comprising:
   a first circuit which energizes or deenergizes said primary coil to initiate a discharge of a spark in said spark plug;
   a second circuit which produces a flow of current through said primary coil in a direction opposite a direction in which a flow of current through said primary coil was produced by the first circuit during the discharge of the spark initiated by the first circuit, thereby keeping a flow of current through the secondary coil in the same direction as when a flow of current through the secondary coil was initiated by the first circuit, to continue a discharge of sparks; and
   a control portion which controls and operation of the second circuit,
   wherein the control portion calculates a target value of an energy input amount of energy inputted into the spark plug based on an in-cylinder flow velocity (v) that is a rate of flow in a cylinder of the internal combustion engine, a cylinder pressure in the cylinder of the internal combustion engine, and an air-fuel ratio, the control portion also calculating a command value of a secondary current that is a flow of current through the secondary coil based on the in-cylinder flow velocity, and
   wherein the control portion controls the operation of the second circuit using the target value of the energy input amount and the command value of the secondary current.

2. An ignition apparatus as set forth in claim 1, wherein the control portion calculates the command value of the secondary current according to an equation below $$I^* = a \cdot v$$

where a is a constant.

3. An ignition apparatus as set forth in claim 1, wherein the control portion calculates the target value of the energy input amount according to an equation below $$E^* = b \cdot v + c \cdot P + d \cdot \text{AFR}$$

where b, c, and d are constants.

4. An ignition apparatus as set forth in claim 1, further comprising a rotational speed detecting portion which detects a rotational speed of the internal combustion engine, and wherein the control portion calculates the in-cylinder flow velocity based on a detected value of the rotational speed and also calculates the target value of the energy input amount and the command value of the secondary current based on a calculated value of the in-cylinder flow velocity.

5. An ignition apparatus as set forth in claim 1, further comprising an intake pressure detecting portion which detects a pressure of intake air sucked into the internal combustion engine, and wherein the control portion calculates the cylinder pressure based on a detected value of the pressure of the intake air and also calculates the target value of the energy input amount based on a calculated value of the cylinder pressure.

6. An ignition apparatus as set forth in claim 1, further comprising a fuel injector which supplies fuel into the internal combustion engine, an injection quantity commanding portion which calculates a command value of an injection quantity of fuel supplied by the fuel injector, and an intake quantity detecting portion which calculates or detects a volume of intake air sucked into the internal combustion engine, and wherein said control portion calculates the air-fuel ratio based on the command value of the injection quantity and a detected value of the intake air volume and also calculates the target value of the energy input amount based on a calculated value of the air-fuel ratio.

7. An ignition apparatus as set forth in claim 6, further comprising a detecting portion which detects at least one of a pressure of intake air sucked into the internal combustion engine and a rotational speed of the internal combustion engine, wherein said control portion uses a value detected by the detecting portion to determine whether an operating state of the internal combustion engine is a steady state or a transient state, and wherein when determining that the operating state of the internal combustion engine is the transient state, the control portion uses the command value of the injection quantity and the detected value of the intake air volume to calculate the air-fuel ratio.

* * * * *